United States Patent [19]

Masclet et al.

[11] 4,170,332

[45] Oct. 9, 1979

[54] RETRACTABLE UNDERCARRIAGE ESPECIALLY FOR THE FUSELAGE OF AN AIRCRAFT

[75] Inventors: Jean Masclet, Paris; André Turiot, Morsang sur Orge, both of France

[73] Assignee: Messier-Hispano-Bugatti, Montrouge, France

[21] Appl. No.: 880,068

[22] Filed: Feb. 22, 1978

[30] Foreign Application Priority Data

Feb. 23, 1977 [FR] France .............................. 77 05230
Mar. 7, 1977 [FR] France .............................. 77 06624

[51] Int. Cl.² .......................................... B64C 25/14
[52] U.S. Cl. ............................................ 244/102 R
[58] Field of Search ................... 244/100 R, 102, 104

[56] References Cited

U.S. PATENT DOCUMENTS

| | | | |
|---|---|---|---|
| 2,772,060 | 11/1956 | Bendicsen | 244/102 SL |
| 2,960,288 | 11/1960 | Havtel | 244/102 R |
| 3,346,218 | 10/1967 | Lucien | 244/102 R |
| 3,357,659 | 12/1967 | Lucien | 244/102 R |

FOREIGN PATENT DOCUMENTS 1088289  3/1955  France .............................. 244/102 R

*Primary Examiner*—Galen L. Barefoot
*Attorney, Agent, or Firm*—Scully, Scott, Murphy & Presser

[57] ABSTRACT

A landing gear undercarriage which attaches to and retracts into the fuselage of an aircraft. The undercarriage has left and right matching portions, each of which includes a forward strut and a rearward hydraulic jack, both of which are coupled to the fuselage by cardan joints. A shock absorber is mounted on the fuselage outside of the strut and converges downwardly towards the strut to which it is coupled at the bottom by a cardan joint. A cylindrical sleeve is mounted at the bottom of the strut, and a spindle which supports a landing wheel is rotatably mounted in the sleeve. The bottom of the hydraulic jack is coupled to the spindle, and the arrangement is such that as the jack causes the undercarriage to retract into the fuselage, the spindle and wheel are rotated into a flat position in which they may be stored in a relatively small landing gear well. A second embodiment is also disclosed which is substantially similar to that already described, but wherein the mechanical linkages to the spindle are slightly different.

13 Claims, 5 Drawing Figures

RETRACTABLE UNDERCARRIAGE ESPECIALLY FOR THE FUSELAGE OF AN AIRCRAFT

BACKGROUND OF THE INVENTION

The present invention relates to a retractable undercarriage for an aircraft, and more particularly, pertains to an undercarriage for the fuselage of an aircraft wherein the sets of landing gear are pivotably connected to the fuselage of the aircraft, and are designed to recede into this fuselage upon retraction.

Fuselage undercarriages are often utilized in situations wherein it is not practical to fasten the undercarriages beneath the wings of an aircraft, either because the latter are too high or too thick, or because the wings have a variable geometry. The retractable wheels of a fuselage undercarriage occupy a minimal space when the axes about which they pivot are placed perpendicular to the plane of symmetry of the aircraft, but in an arrangement of this type when the undercarriages are placed in a "landing gear down-locked" position the distance between the wheels of the undercarriages is too small to provide sufficient stability for the aircraft.

This disadvantage has been compensated for by selectively tilting the axes about which the undercarriages pivot relative to the plane of symmetry of the aircraft. However, in an arrangement of this nature when the landing gear is in the down-locked position, an angular relationship exists between the oblique strut of the undercarriage and the wheels, which are perpendicular to the ground. When the undercarriage is retracted, the angular relationship results in the wheels being positioned obliquely in the fuselage which has the effect of increasing the required volume of the landing gear well.

It is well recognized in the fuselage undercarriage art that when the wheels are in a flat position in the "undercarriage retracted" mode they occupy a minimal volume of the undercarriage housing. In fuselage undercarriages of this type, each strut of the undercarriage is integral with the structure of the aircraft fuselage and is pivoted about an axis of retraction which is positioned obliquely relative to the longitudinal plane of symmetry of the aircraft. In this arrangement either the strut or the wheels are supported by an element capable of pivoting in relation to the undercarriage, either in a first approach around the axis of the strut or a part thereof, or in a second approach around a substantially longitudinal axis. In both approaches the wheel supporting element is pivoted by a complex mechanism connected to the strut and/or the wheel bearing element and/or the structure of the aircraft which assures a locked relationship of the strut to the wheel supporting element in its load bearing position. Alternatively, hydraulic actuating cylinders which accomplish the same functions as the complex mechanism are added to the operating jack. These approaches have disadvantages, the first on the basis of weight, because it requires a complex, structurally strong and therefore heavy motor assemblage, and the second on the basis of cost, because it requires an additional hydraulic actuating cylinder.

SUMMARY OF THE INVENTION

An object of the present invention is to provide a fuselage undercarriage which can be positioned in a retracted position in a housing of minimal height in the fuselage, and which requires neither the use of a complex drive means nor the use of a hydraulic actuating cylinder other than the one used to adjust the undercarriage.

A fuselage undercarriage according to the present invention comprises, for each landing gear, on the one side a strut pivoted relative to the fuselage of the aircraft around an axis of retraction tilted toward the longitudinal plane of symmetry of the aircraft and having a sleeve in which is pivotably mounted a movable member supporting at least one wheel and, on the other side a retracting actuator jack which operates counter to the airflow and is characterized in that the shaft and the body of the retracting jack are coupled to the fuselage of the aircraft and to the movable support member by means of cardan linkages with universal joints or the equivalent. Further, a first end of an integral drive is connected to the body of the retracting jack, and the second end of the drive is pivotally connected to the strut such that during actuation of the jack to cause retraction of the undercarriage, the movement of the strut relative to the actuator jack causes a rotation of the body of the actuator which is transmitted by the integral drive to the movable member to thus cause it to rotate in the sleeve. This rotation gives the movable member and the wheels a positioning movement complementary to the movement of the undercarriage about the axis of retraction.

In a particular embodiment of the invention, the integral drive comprises a unique connecting rod of fixed length joined at its ends to the body of the actuator and the strut of the undercarriage.

In another embodiment of the invention, the integral drive comprises a first linkage rod pivotally coupled at one end to the body of the actuator and at the other end to the end of a first arm of a bent crank lever which is pivotally mounted on the strut at the end of its second arm. One end of a second linkage rod is connected to the bend in the crank lever, and its other end is connected to the end of a rigid lever which is fixedly coupled to the movable member, such that during operation of the undercarriage controlled by the actuator jack, the first linkage rod causes the bent lever to pivot, which results in, by means of the second linkage rod, a rotation of the rigid lever and of the movable member to cause the wheels to assume a positioning movement complementary to the movement of the undercarriage about the axis of retraction.

In one preferred embodiment of the invention the strut is pivotally connected to the fuselage at one end by a universal joint about an axis of retraction which is substantially parallel to the longitudinal axis of the aircraft and which passes through the universal joint by which the jack is connected to the fuselage, and the other end of the strut has said sleeve mounted thereon and is coupled to said shock absorber.

BRIEF DESCRIPTION OF THE DRAWINGS

Two preferred embodiments of the invention are described herein by virtue of non-limiting examples with regard to the attached designs in which.

DETAILED DESCRIPTION OF THE DRAWINGS

Figure 1:
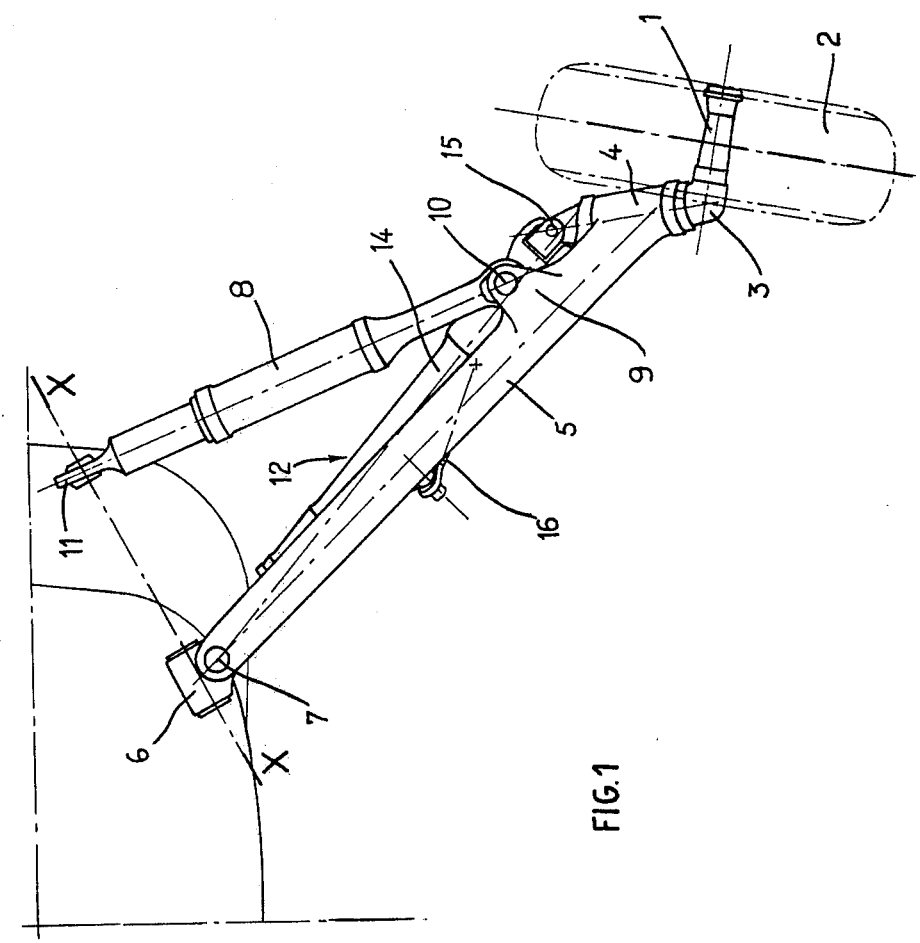
FIG. 1 is a front elevational view of the left undercarriage in the down and locked position according to a first embodiment of the invention, with the right undercarriage being symmetrical.
Figure 2:
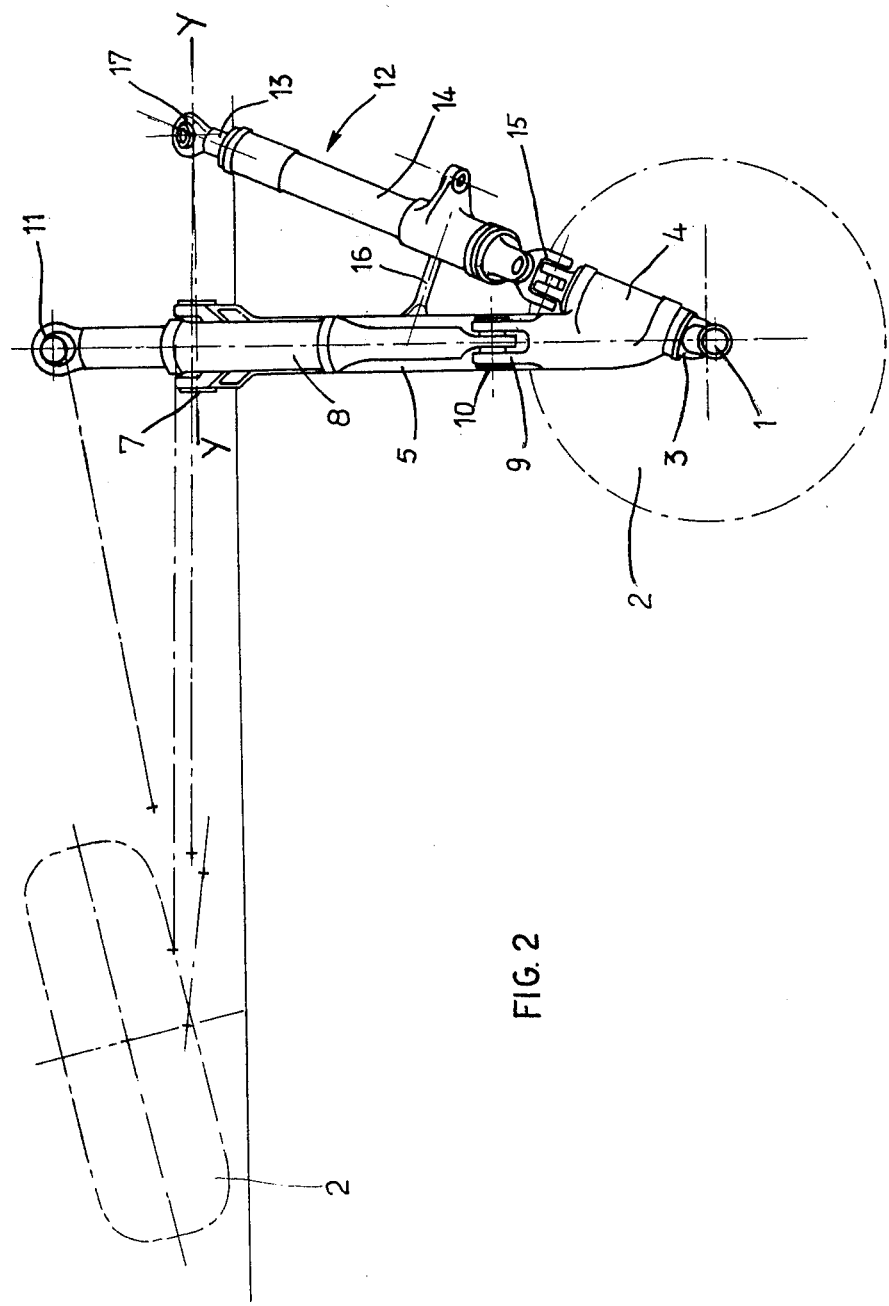
FIG. 2 is a side elevational view of the undercarriage according to FIG. 1, showing, in addition, in phantom lines, the position occupied by the wheel in the position in which the undercarriage is retracted.

With reference to FIGS. 1 and 2, the undercarriage has an axle 1 supporting a wheel 2 with the axle being integral with the lower extremity of a spindle 3 mounted pivotally in a sleeve 4. The sleeve 4 extends through the lower end of a strut 5 which is pivoted at its upper end by a cardan or universal joint 6 having a pivot pin 7.

The lower end of a shock absorber 8 is connected to strut 5 by means of a lug 9 and a pivot pin 10. The upper end of the shock absorber is connected to the fuselage structure of the aircraft by means of a coupling 11, which is shown in the form of a swivel joint. The geometric axis X—X passes through the location where the cardan joint 6 is pivotally mounted to the structure of the fuselage and also through the center of the swivel joint 11. The geometric axis X—X defines the axis of retraction of the undercarriage, around which pivots a first hinged triangle formed by the strut member 5 and the shock absorber 8, under the influence of the actuating jack and wind-resistant strut 12. The actuating jack and wind-resistant strut 12 is connected via shaft 13 to the structure of the fuselage by means of a coupling 17 shown in the form of a ball and socket joint. The center of the coupling 17 is on the geometric axis Y—Y which also extends through the pivot pin 7 of the pivotal connection of the strut member 5 in the cardan joint 6. Accordingly, the axis Y—Y forms the axis of articulation about which the undercarriage pivots under pressure or stress from the undercarriage, and around which pivots a second hinged triangle formed by the strut member 5 and the actuating jack 12. The displacements of this second triangle caused by pressures or stress from the undercarriage are damped by the shock absorber 8.

The body 14 of the actuating jack 12 is connected via a cardan or universal joint 15 to the upper part of the spindle 3 which extends beyond the sleeve 4. In addition, one end of a connecting rod 16 of fixed length is connected to the body 14 of the jack 12, and the other end of the rod 16 is connected to the strut member 5.

The adjustable jack is a hydraulically actuated cylinder of a type well known in the technical field of undercarriages. It comprises an internal arresting device in an "up-locking rod" position and also a similar device for locking the jack in a "down-locking rod" position.

It is an object of the embodiment described in detail herein to place the undercarriage in a housing of minimal height when it is in a retracted position. The axis of retraction X—X is situated in a plane perpendicular to the longitudinal axis of the fuselage, and is inclined downwardly (from top to bottom) towards the longitudinal plane of symmetry of the aircraft when the axis of articulation is parallel to the longitudinal axis of the aircraft. In order to limit the stress transmitted to the cardan joint 15, the axle of the sleeve is intentionally inclined downward slightly towards the exterior of the aircraft.

The undercarriage of the structure just described functions in the following manner:

In the "down-locking" position of the undercarriage shown in solid lines in FIGS. 1 and 2, the actuation jack and wind-resistant strut 12 is locked in an "up-locking" position. In this position the jack 12 acts as a brace for the strut of the undercarriage which is therefore locked in a "down-locking (landing gear) undercarriage" position. The actuation jack 12 also provides, by the cardan shaft 15, for angular locking of the movable equipment which is comprised of the spindle 3, the axle 1 and the wheel 2, all of which pivot within the sleeve 5. Since the axis Y—Y is defined by the pivot pin 7 of the cardan joint 6 and by the coupling 17 of the shaft 13 of the jack 12 to the fuselage, and is parallel to the longitudinal axis of the aircraft, the sleeve of strut 5 is restrained in the vertical plane which contains it during functioning of the shock absorber 8, such that the plane of the wheel 2 remains parallel to the longitudinal axis of the aircraft. Because of the inclination of the strut 5, the width of the undercarriage increases when the shock absorber 8 is compressed, which in turn assists in damping of the energy of the undercarriage by the sliding of the tires and also assists in stabilizing the aircraft.

In order to raise the landing gear, which takes place towards the front of the aircraft, the jack 12 is unlocked and the rod 13 is thereby free to move relative the body 14. As a result of a lengthening of the actuator jack 12, the movable equipment including the strut 5 and the shock absorber 8 pivot about the axis of retraction X—X. During the lifting, the relative movement of the jack 12 toward the strut 5, while the two are coupled together by the fixed length connecting rod 16 causes a rotational movement of the body 14 of the jack 12 relative to the shaft 13. This rotational movement of the body 14 is transmitted by the cardan shaft 15 to the spindle 3, mounted pivotally in the sleeve 4, and the movable equipment is caused to rotate around the axis of the sleeve 4. Accordingly, the wheel 2 is displaced towards the front of the sleeve 4, such that the angle between the plane of the wheel 2 and the plane defined by the axis of the strut 5 and the axis of the shock absorber is decreased, and the wheel 2 is positioned substantially flat in the fuselage in a "retracted undercarriage" position. During raising of the undercarriage, the shock absorber 8 may move but the triangle formed by the strut 5 and the shock absorber 8 remains rigid such that the shock absorber 8 functions as a guide bar to guide the movement of the strut 5.

Figure 3:
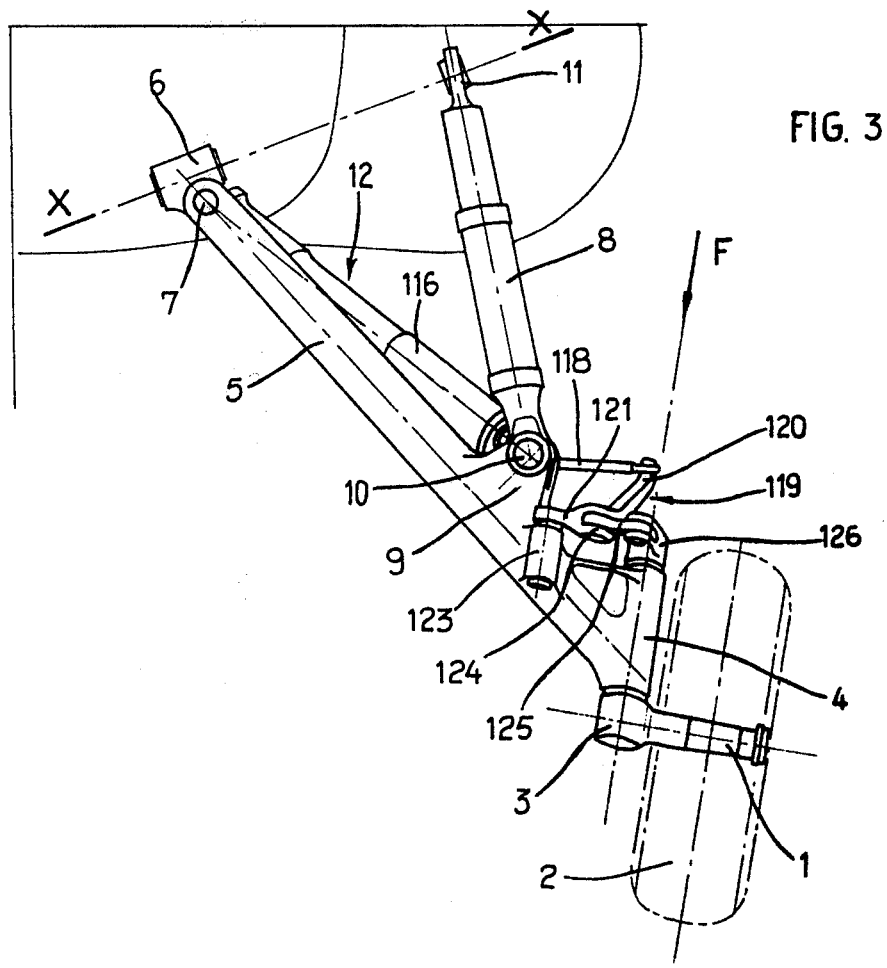
FIG. 3 is a view analogous to FIG. 1, of a left undercarriage according to a second embodiment of the invention.
Figure 4:
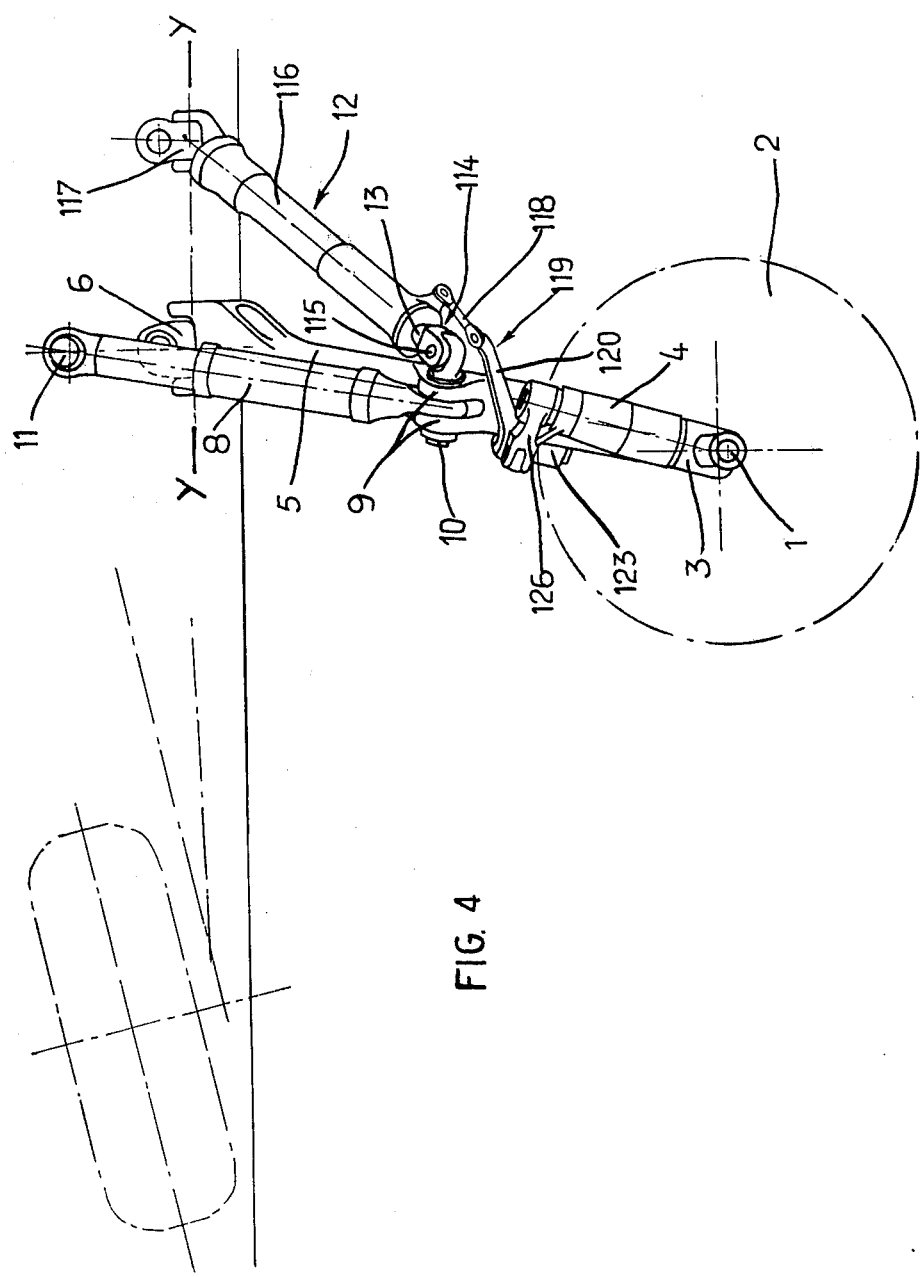
FIG. 4 is a side view of the undercarriage according to FIG. 3, showing, in addition, in phantom lines, the position occupied by the wheel in the position in which the undercarriage is retracted.
Figure 5:
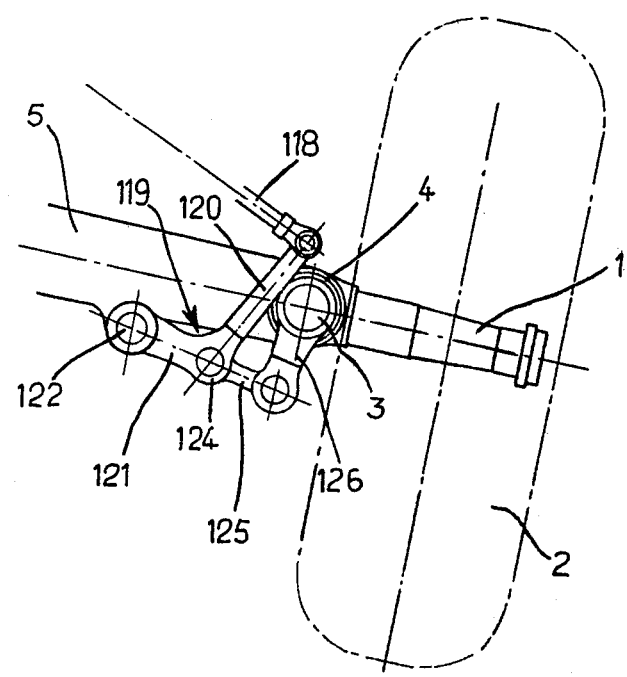
FIG. 5 is a fragmentary view in the direction of arrow F of FIG. 3 showing, on an enlarged scale, the positions occupied by the first linkage rod, the crank lever, the second linkage rod, and the rigid lever of the movable member in a "down and locked" position.

The undercarriage according to a second embodiment illustrated in FIGS. 3 and 4, is very similar to the one in FIGS. 1 and 2. It differs only in the structure of the integral drive which connects the strut of the undercarriage to the body of the jack. Accordingly, a detailed description will not be given of the undercarriage as it is substantially the same as that of the previous embodiment. In FIGS. 3 to 5 the elements similar to those of FIGS. 1 and 2 are provided with identical reference numerals.

The undercarriage comprises movable equipment pivotally mounted in the sleeve 4 formed in the body of strut 5. The shock absorber 8 is connected to the body of the strut 5 and to the fuselage in the same manner as in the first embodiment. The connected triangle formed by the strut 5 and the shock absorber 8 pivots around the axis X—X previously defined, under the influence of actuating jack and wind-resistant strut 12.

The shaft 13 of the jack and wind-resistant strut 12 is connected by an attachment 114 and an axle 115 to the axle 10, which joins the lower point of attachment of the shock absorber 8 to the body of the strut 5. The arrangement is pivotally mounted in the attachment 9 to allow sufficient freedom of maneuverability to the end of the shaft 13. Thus, the actuator jack 12 and the shock absorber 8 are both connected to the body of the strut 5 by the axle 10.

The body 116 of the jack 12 pivots at a second cardan joint 117 about a geometric axis which coincides with the geometric axis Y—Y defined by the axis of articulation. This pivoting occurs along with that of the case 5 on the cardan shaft 6, such that the axis Y—Y defines the axis about which the undercarriage pivots under the weight of the aircraft. Accordingly, a second connected triangle formed by the strut 5 and the actuator jack 12 to which the cardan joint 117 is connected pivots about a second axis, with the displacement of this second triangle occuring under the weight of the undercarriage and being damped by the shock absorber 8.

One end of a first linkage 118 is connected to the body 116, and the other end of the linkage is connected to an arm 120 of a bent crank lever 119 pivotally mounted on the casing of strut 5 by its other arm 121 (see FIG. 5). The other arm 121 has an end with a small one piece spindle 122 pivotally mounted in a sleeve supplement 123. The bent crank lever 119 is angled at 124 at which location is connected a second linkage 125 which is connected by its other end to a straight lever 126. The straight lever 126 is fixedly connected to the upper portion of the shaft 3, which extends down into the sleeve 4.

The actuator jack of the wind-resistant device 12 can be of the hydraulic type comprising some internal locking devices in a "rod up-locking" position and in a "rod down-locking" position.

Further, in this embodiment, the axis of retraction X—X is situated in a plane perpendicular to the longitudinal axis of the fuselage, and is inclined downwardly towards the longitudinal plane of symmetry of the aircraft, whereas the axis of articulation Y—Y about which the undercarriage rotates under the weight or stress of the aircraft is parallel to the longitudinal axis of the aircraft. When the shock absorber 8 is released in the "down-locking gear" position, the axis of the sleeve is inclined slightly inwardly in a downward direction in relation to the aircraft, such that the movable equipment comprising the shaft 3, the spindle 1 and the wheel 2 are correctly aligned when the undercarriage is under static pressure to correctly distribute the stresses or forces in the internal drive consisting of elements 118, 119, 125 and 126.

The undercarriage of the structure just described functions in the following manner:

In the "down-locking landing gear" configuration, shown in solid lines in FIGS. 3 and 4, the actuator jack and wind-resistant strut 12 are locked into an "up-locking rod" position and acts as a brace for the strut of the undercarriage which is locked in a "down landing gear" position. In this position jack 12 secures, by means of its body 116 and the first linkage rod 118, the angular locking of the movable equipment carried by the strut 5. Alignment is attained by the relationship of the second linkage rod 125 to the arm 121 of the crank lever 119, the angular position of which in relation to the body of strut 5, on which the crank lever 119 is pivotally mounted is defined by the first linkage rod 118.

During lifting of the undercarriage, which takes place towards the front of the aircraft, the jack 12 is unlocked, and the shaft 13 is extended from the body 116. The lengthening of the jack 12 causes the strut 5, and the movable equipment mounted thereon, along with the shock absorber 8 to pivot about the axis of retraction X—X. The lengthening of the jack 12 causes the linkage rod 118 to rotate the crank lever 119 about the central axis of the sleeve 123. Rotation of crank lever 119 moves arm 121 and the second linkage rod 125 out of alignment which in turn causes rotation of arm 126 and the shaft 3. Accordingly, the movable equipment is rotated about the axis of the sleeve 4, the wheel 2 is displaced towards the front of the sleeve 4, and the angle is reduced between the plane of the wheel 2 and the plane defined by the axis of the strut 5 and the axis of the shock absorber 8, with the wheel 2 being placed substantially flat in the fuselage in a "retracted landing gear" position.

During lifting of the undercarriage, the shock absorber 8 remains loosened, such that the triangle formed by the strut 5 and the shock absorber 8 remains substantially rigid with the shock absorber 8 serving as a guide bar to guide the movement of the strut 5.

It is apparent that numerous modifications can be applied to the embodiments described within the teachings of the present invention.

For example, the spindle 1 can be shared by two wheels mounted side by side on a dolly. The ball and socket joint connections can be replaced with cardan shaft connections. Also the teachings of the present invention may be applied to undercarriages of fuselages which retract either towards the front or the rear, controlled by the extension or retraction of the rod of an actuator jack which is attached to the fuselage either to the front of or to the rear of the strut.

What is claimed is:

1. A retractable undercarriage for the fuselage of an aircraft, comprising for each undercarriage, on a first side, a strut pivotally coupled to the fuselage of the aircraft about an axis of retraction inclined relative to the longitudinal plane of symmetry of the aircraft and having a sleeve, a movable member pivotally mounted in said sleeve and having coupled thereto at least one wheel, and on a second side, a wind-resistant actuator jack, said strut and jack being connected to the fuselage of the aircraft by universal joints, and the movable member being connected to the jack by a universal joint, and in which a first end of an integral drive is connected to the jack, and a second end of the integral drive is connected to the strut, such that during operation of the undercarriage, controlled by the jack, the relative movement of the strut relative to the jack combined with the restraint of the integral drive, causes a rotation of the jack which results in a rotation of the movable member in the sleeve to cause the wheels to undergo a positioning movement complementary to a movement of the undercarriage about the axis of retraction.

2. An undercarriage according to claim 1 in which the integral drive comprises a unique connecting rod of fixed length connected at one end to the body of the jack and at its other end to the strut.

3. An undercarriage according to claim 1 in which the integral drive comprises a first linkage rod coupled at one end to the body of the jack, a bent crank lever having a first arm coupled to the other end of said first linkage and being pivotally mounted on the strut at the end of its second arm, and a second linkage rod connected between said crank lever at its angled portion and the end of a rigid lever coupled to the movable member, such that during operation of the undercarriage, controlled by the jack, the first linkage rod pivots the crank lever, which controls, by means of the second linkage rod, the rotation of the rigid lever and the movable member to impart to the wheels a positioning movement complementary to the movement of the undercarriage about the axis of retraction.

4. An undercarriage according to claim 3, in which the strut pivots at one end by a universal joint about an axis of retraction which is substantially parallel to the longitudinal axis of the aircraft and which passes through the universal joint by which the jack is connected to the fuselage, and the other end of the strut has said sleeve mounted thereon, and also is coupled to said shock absorber.

5. An undercarriage according to claim 4, in which said movable member has a shaft pivotally mounted in said sleeve and has as an integral lower portion thereof an axle for at least one wheel.

6. An undercarriage according to claim 5, in which the upper end of said shaft passes beyond the sleeve and is coupled to the rigid lever connected to the crank lever by the second linkage rod.

7. An undercarriage according to claim 6 in which in a "down-locking landing gear (undercarriage)" position, the movable member is locked in position through a linear alignment of the second linkage rod with the second arm of the crank lever.

8. An undercarriage according to claim 2, in which the jack is coupled to the fuselage by a universal joint which, along with the universal joint which couples the strut to the fuselage defines an axis of articulation.

9. An undercarriage according to claim 8, in which the axis of retraction is located in a plane perpendicular to the longitudinal axis of the aircraft, and in which the axis of articulation is parallel to the longitudinal axis of the aircraft.

10. An undercarriage according to claim 2, in which a universal joint couples the body of the actuator jack to the upper part of said movable member.

11. An undercariage according to claim 1, in which retraction of the undercarriage takes place towards the front of the aircraft under the control of said wind-resistant actuator jack locked in a "rod up-locking" position to counteract the wind against the undercarriage in a "landing gear downlocking" position.

12. An undercarriage according to claim 1, in which the axis of said sleeve is inclined downward and slightly towards the exterior of the aircraft.

13. An undercarriage according to claim 1, in which the axis of said sleeve is inclined downward and slightly towards the interior of the aircraft.

* * * * *